United States Patent [19]
Hill

[11] 3,753,347
[45] Aug. 21, 1973

[54] RANKINE CYCLE POWER PLANT WITH COMPRESSIBLE FLUID TORQUE CONVERTER

[75] Inventor: Charles C. Hill, La Jolla, Calif.
[73] Assignee: Power Technology Corporation, Bloomfield, Mich.
[22] Filed: Dec. 29, 1971
[21] Appl. No.: 213,345

[52] U.S. Cl............................ 60/105, 60/1, 60/36, 60/39.18 B
[51] Int. Cl............................................. F01k 27/00
[58] Field of Search .................. 60/1, 36, 12, 105, 60/57, 59, 59 T, 330

[56] References Cited
UNITED STATES PATENTS
2,878,642   3/1959   Maurice et al.......................... 60/12
3,314,232   4/1967   Hill.................................. 60/59 T X
3,500,637   3/1970   Toy.................................... 60/12 X Primary Examiner—Martin P. Schwadron
Assistant Examiner—Allen M. Ostrager
Attorney—Barnes, Kisselle, Raisch & Choate

[57] ABSTRACT

A Rankine cycle power plant which has its output shaft connected to the input rotor of a compressible fluid torque converter. Fluid lines connect the casing of the torque converter with the Rankine cycle power plant. By varying the density of the fluid in the compressible fluid torque converter, a variable speed output can be achieved without the use of high speed gearing.

9 Claims, 3 Drawing Figures

INVENTOR.
CHARLES C. HILL

RANKINE CYCLE POWER PLANT WITH COMPRESSIBLE FLUID TORQUE CONVERTER

This invention relates to Rankine cycle power plants and particularly to the output drive of such power plants.

BACKGROUND OF THE INVENTION

In Rankine cycle power plants such as steam turbines, it is common to utilize gearing or hydraulic torque converters in order to provide variable speed drive.

Among the objects of the invention are to provide a system utilizing a Rankine cycle power plant which avoids the need for high speed gearing or hydraulic torque converters.

SUMMARY OF THE INVENTION

A Rankine cycle powr plant which has its output shaft connected to the input rotor of a compressible fluid torque converter. Fluid lines connect the casing of the torque converter with the Rankine cycle power plant. By varying the density of the fluid in the compressible fluid torque converter, a variable speed output can be achieved without the use of high speed gearing.

DESCRIPTION

Figure 1:
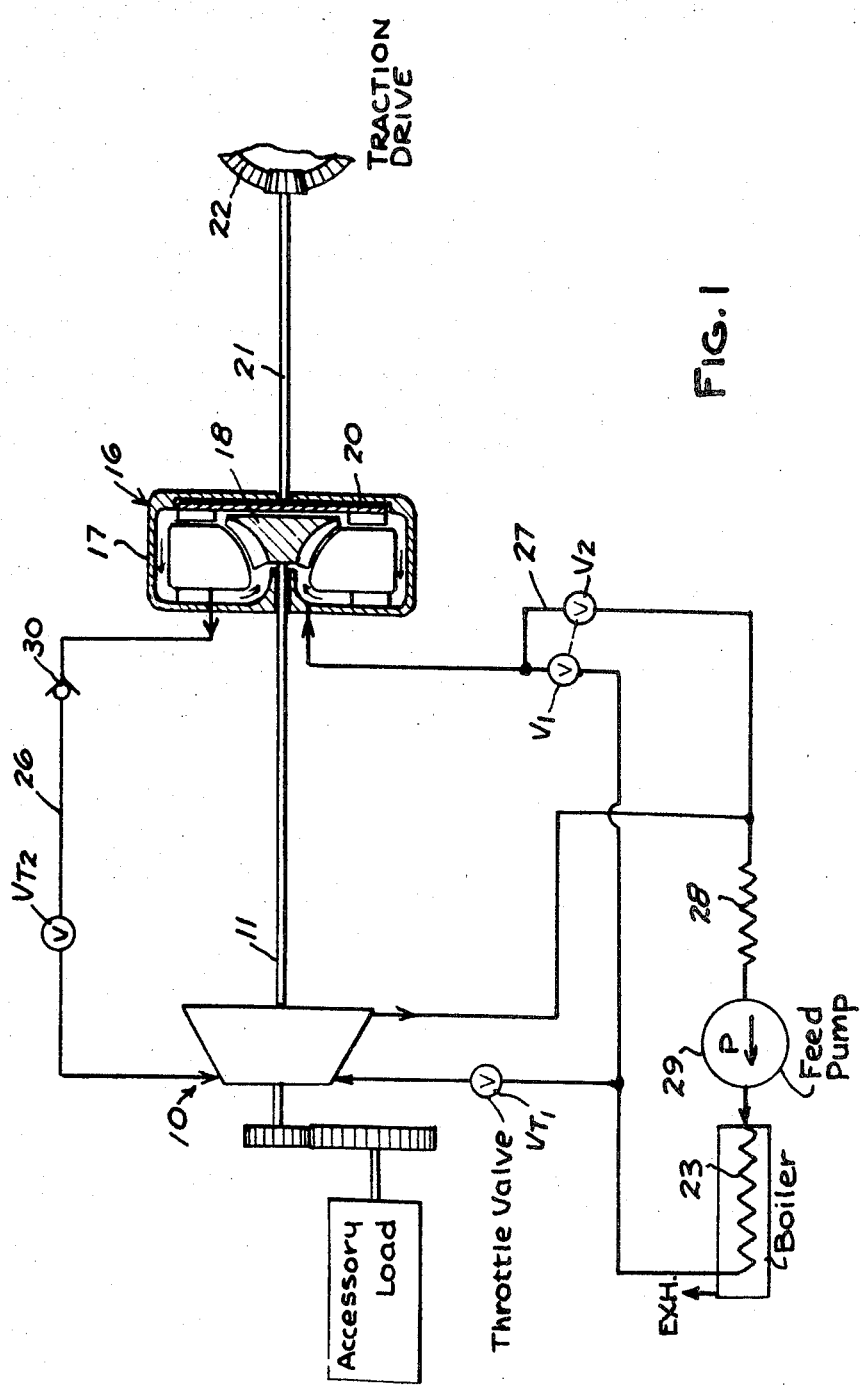
FIG. 1 is a diagrammatic view of the drive system embodying the invention.

Referring to FIG. 1, the apparatus embodying the invention comprises a Rankine cycle power plant 10 such as a steam turbine which has a first output shaft 11 and a second output shaft 12, the latter being connected by gearing 13, 14 to operate an accessory load 15.

A compressible fluid torque converter 16 is provided and includes a casing 17 in which are located an input rotor 18, stator 19, and an output rotor 20. The output shaft 11 of the power plant 10 is connected to the input rotor 18 while the output rotor 20 has a drive shaft 21 that is connected to the load such as traction drive 22.

The operating fluid such as steam is provided by a boiler 23 and is directed through a line 24 to the casing of the compressible fluid torque converter 16. An additional line 25 supplies the fluid to the turbine 10. A line 26 extends from the casing 17 to the turbine or power plant 10. Finally, a line 27 is provided and extends to the condenser 28 and feed pump 29.

On-off valves $V_1$, $V_2$ are provided in the lines 24, 27, respectively, to control the flow of compressible fluid into and out of the casing 17. Throttle valves $V_{T1}$ and $V_{T2}$ are provided in the lines 25, 26, respectively, to vary the flow of fluid to the power plant 10. A check valve 30 is provided in line 26 so that fluid can flow only from the casing to the power plant.

In operation, the power plant 10 is continuously operating at the speed required to provide power for driving the accessory device 15. When additional load such as traction load is desired, valve $V_1$ is opened and valve $V_2$ is closed, the valves being interconnected, to provide operating fluid to the casing 17. This causes rotation of the output rotor 20 thereby rotating the output shaft 21. By controlling the density through the degree of pressurization or the temperature in the fluid in the casing 17, the magnitude of power derived from the power plant can be varied. Since the fluid circulates within the casing and returns through line 26 to the turbine, transmission losses are regenerated to the power plant cycle. The throttle valve $V_{T1}$ controls the flow of fluid to the turbine.

In another mode of operation, the valve $V_{T1}$ is closed and all of the flow is first through the compressible fluid torque converter and then through the power plant, the valve $V_{T2}$ acting as a throttle valve if desired.

Figure 2:
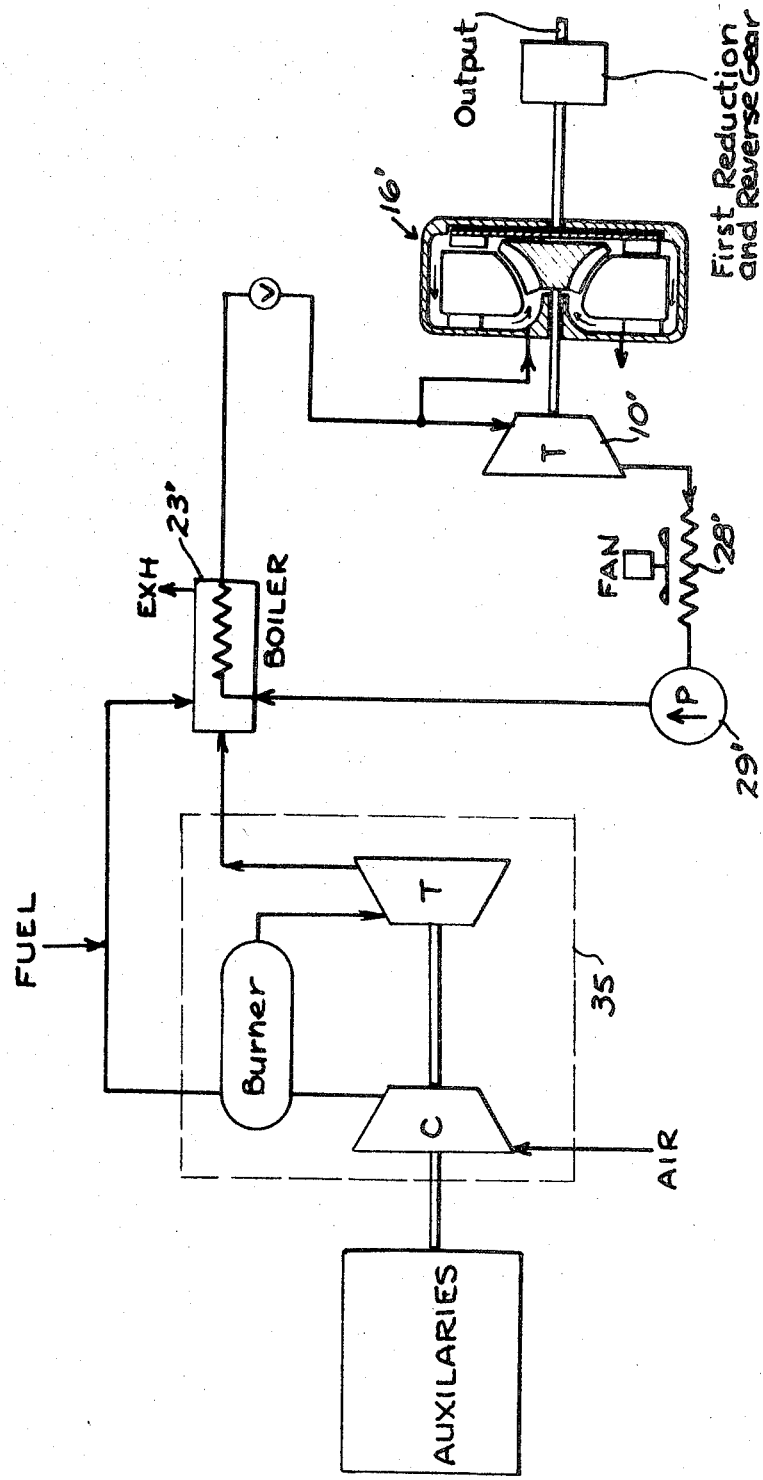
FIG. 2 is a schematic diagram of a modified form of the invention.

In another mode of operation, for idling, the valve $V_{T1}$ is closed and the valve $V_{T2}$ is opened to connect the converter to the lower pressure of the condenser. This evacuates the casing of the torque converter. Check valve 30 prevents the high pressure steam from entering the casing and therefore output power is at a minimum corresponding to an idle condition. In the form of the invention shown in FIG. 2, the boiler 23' is operated by the exhaust gases from a turbine 35. The turbine can be utilized for operating auxiliary devices such as the condenser fan, air compressor, starter, alternator and the like. In all other respects the system is identical to that shown in FIG. 1 and the controls can be similar. This system has the advantage in that the turbine can be utilized for the function of providing the steam and also operating auxiliary devices.

Figure 3:
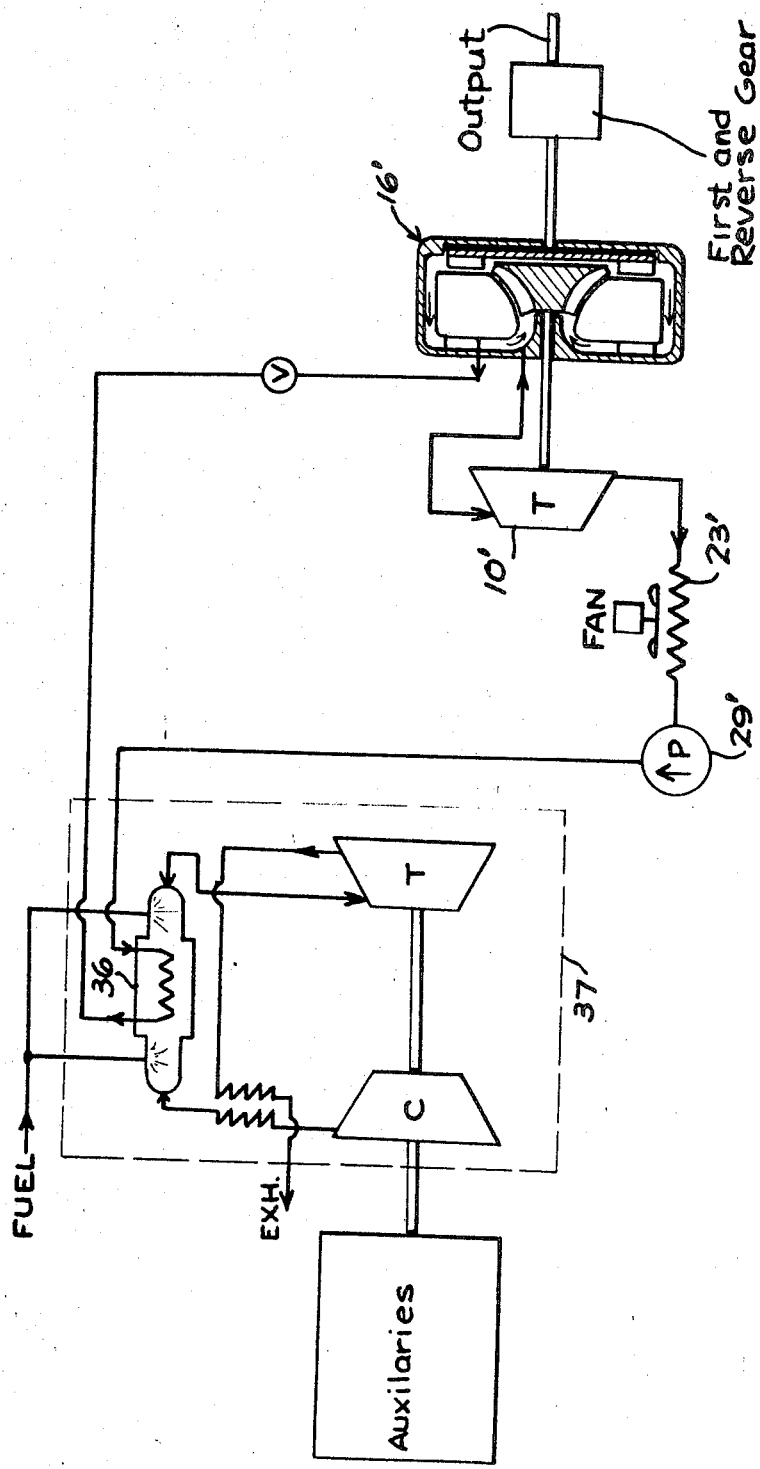
FIG. 3 is a schematic diagram of a further modified form of the invention.

In the form of the invention shown in FIG. 3, the steam for the turbine 10' is obtained by providing the coils 36 directly in the combustion chamber of the gas turbine engine 37 so that a more efficient heat transfer can be obtained. The gas turbine 37 is utilized for operating auxiliary devices as in the form of the invention shown in FIG. 2.

I claim:

1. The combination comprising:
 a Rankine cycle power plant comprising a turbine,
 said turbine having an output shaft,
 a compressible fluid torque converter having a casing,
 said compressible fluid torque converter having an input rotor in said casing to the output shaft of said power plant,
 a stator,
 and an output rotor,
 a line extending from said casing to said turbine of said power plant.

2. The combination set forth in claim 1 including means for supplying said operating fluid to said power plant.

3. The combination set forth in claim 2 including means for draining the operating fluid from the casing when the fluid torque converter is not to be used.

4. The combination set forth in claim 2 wherein said means for supplying operating fluid comprises a boiler.

5. The combination set forth in claim 4 including a gas turbine engine,
 said boiler utilizing the exhaust gases of said gas turbine engine.

6. The combination set forth in claim 4 including a gas turbine engine,
 said boiler forming a part of said gas turbine engine.

7. The combination set forth in claim 1 including valve means for controlling the flow of fluid to said casing.

8. The combination set forth in claim 7 including means for draining said casing,
and valve means for controlling the last-mentioned means,
said first-mentioned valve means and said second-mentioned valve means being interconnected so that when one is open, the other is closed, and vice versa.

9. In an apparatus comprising a Rankine cycle power plant including a turbine and a fluid torque converter, said fluid torque converter including a casing having an input rotor in said casing connected to the output of the power plant and an output rotor operated in said casing with a fluid line interconnecting said casing and said turbine of said power plant and means for supplying fluid to said casing, the method which comprises
directing all of the fluid to said casing and thereafter to the turbine of the power plant to operate the power plant.

* * * * *